United States Patent [19]

Matsui

[11] Patent Number: 5,066,129
[45] Date of Patent: Nov. 19, 1991

[54] OPTICAL LINEAR ENCODER WITH LIGHT QUANTITY CALABRATION

[75] Inventor: Keiji Matsui, Miwa, Japan

[73] Assignee: Kabushiki Kaisha Okuma Tekkosho, Aichi, Japan

[21] Appl. No.: 574,290

[22] Filed: Aug. 28, 1990

[30] Foreign Application Priority Data

Aug. 30, 1989 [JP] Japan ............................... 1-224016

[51] Int. Cl.$^5$ ............................................ G01B 9/02
[52] U.S. Cl. ..................................... 356/356; 356/374; 250/237 G
[58] Field of Search ............... 356/356, 358, 363, 374; 250/237 G, 231.14, 231.16

[56] References Cited

U.S. PATENT DOCUMENTS

| | | | |
|---|---|---|---|
| 4,767,925 | 8/1988 | Kawamoto | 250/231.16 |
| 4,836,681 | 6/1989 | Van Sauers et al. | 250/237 G |
| 4,979,827 | 12/1990 | Matsui | 356/356 |

*Primary Examiner*—Samuel Turner
*Attorney, Agent, or Firm*—Wenderoth, Lind & Ponack

[57] ABSTRACT

In an averaged diffraction moire position detector of the present invention, diffracted lights which have passed through the same places as those through which measuring diffracted lights have passed are used for monitoring a quantity of light. Therefore, change in the quantity of light of a light source and change in the transmittance of diffraction gratings can be suitably corrected.

3 Claims, 7 Drawing Sheets

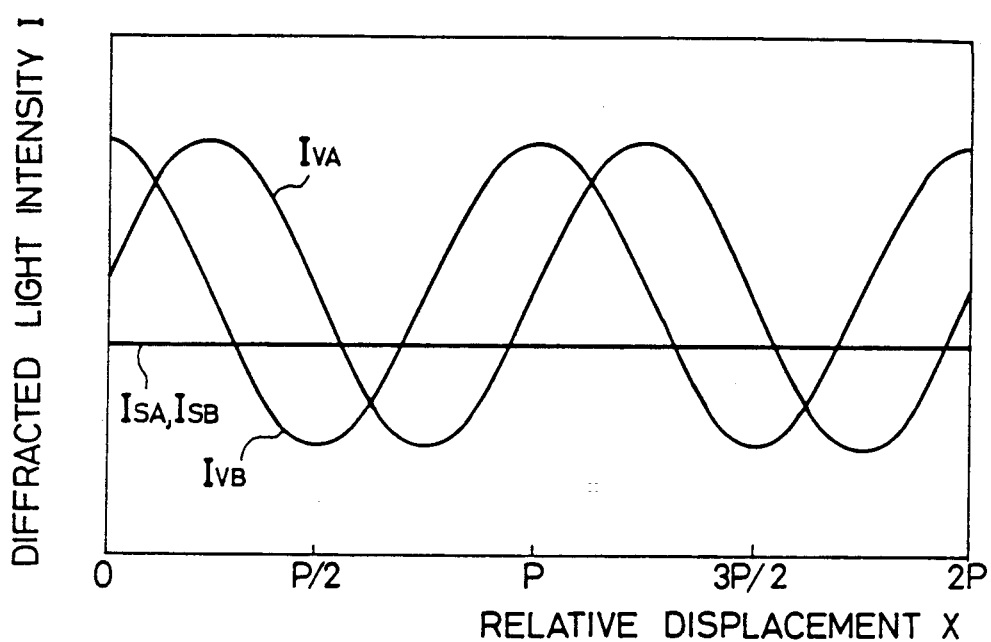
F I G. 10
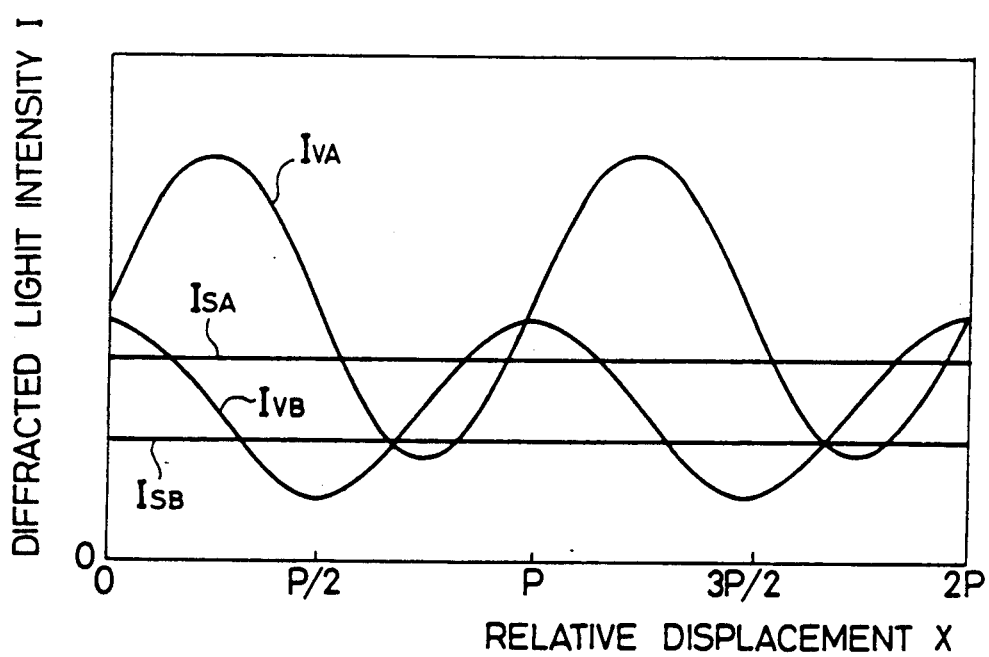
F I G. 11

OPTICAL LINEAR ENCODER WITH LIGHT QUANTITY CALIBRATION

BACKGROUND OF THE INVENTION

1. Field of the Invention

The present invention relates to an optical linear encoder used for the measurement of positions in machine tools or the like, and in particular to a position detector using moire fringes produced by diffraction gratings.

2. Description of the Prior Art

Since moire fringes obtained by overlapping two diffraction gratings are sensitive to relative changes in a lateral direction and a counting measurement of displacements in fine steps can be made, they have been widely used in methods of measuring length.

Two diffraction gratings (hereinafter referred to as "a first grating" and "a second grating") are mounted on two portions which are displaced relatively to a machine and therefore they must be suitably spaced apart from each other at all times. Meanwhile, when the grating pitch of each of the above-mentioned diffraction gratings is made smaller in order to increase the resolution for length measurement, the influence of the diffraction effect of the light becomes larger. As a result, the shadow of the first grating on the second grating becomes thinner because of the diffraction effect and direct moire fringes with high visibility cannot be obtained. Hence, diffraction moire utilizing a Fourier image has come to be used. That is, when the first grating is irradiated with parallel luminous fluxes whose phases are uniform, the bright and dark distribution (light distribution in which brightness and darkness are reversed is made at a position of a multiple of half-integers) of light having the same pitch as that of the grating spaced an integral multiple of the distance at which two times the square of the pitch P of the grating is divided by a wavelength $\lambda$ is made behind the first grating 1 because of the diffraction effect of the light, and this reproduced bright and dark distribution of light is called a Fourier image. If the second grating is placed at a position where this Fourier image is formed, the diffracted light from the second grating will have a sharp contrast of a cycle P with respect to the relative displacement of the two gratings, which is called diffraction moire in the lateral direction. Applications of a relatively short measurement length as in mask alignment in micromachining such as the fabrication of semiconductors, etc. have been investigated (For instance, p. 984, J. VAC. SCI. TECHNOL. 15(1978), and p. 1276, J. VAC. SCI. TECHNOL. 15(1983)).

On the othr hand, when the length to be measured is made longer, the grating pitch P is made smaller, and the length measuring accuracy is made higher, a length $2P^2/\lambda$ in which a Fourier image can be made becomes abruptly shorter in proportion to the square of the grating pitch P, with the result that it becomes difficult to hold the two diffraction gratings in the gap in which a Fourier image can be made, with high accuracy over a longer distance. When the gap of the grating deviates from the position at which a Fourier image can be made, the intensity of the diffracted light varies greatly and the determination of position becomes impossible. For example, if it is supposed that the grating pitch P is set to 1 $\mu$m and a wavelength $\lambda$ of 0.633 $\mu$m is used, then the gap G of the grating must be kept at sufficiently small variation with respect to the 1.6 $\mu$m that provides a Fresnel number $(\lambda \cdot G)/P^2 = 2$ which is obtained by dividing the product of the gap G of the diffraction grating and the wavelength $\lambda$ of light by the square of the pitch P of the diffrction grating. For this reason, diffraction moire cannot be used in a length measuring method with high accuracy in ordinary machining tools or the like.

Regarding such circumstances, a position detector capable of detecting position with high accuracy by obtaining diffraction moire signals sensitive to a displacement in the lateral direction without being influenced by changes in the gap of the first and second gratings has been disclosed by this applicant (Japanese Patent Laid-open No. 17016/1986).

This position detector is designed to obtain a signal equivalent to the average value of diffraction moire signals by varying the optical path length of the gap between the gratings and detect the position using a signal change, in which half the pitch P of a diffraction grating which appears at this average value, is used as a cycle, in each of the portions of the effective area where the first and second gratings face each other.

FIGS. 1 to 3 are perspective views each illustrating one example of the above-mentioned averaged diffraction moire position detector. A case where zero-order diffracted light is used will be explained below.

In FIG. 1, first, a first grating 1 is irradiated with a laser beam LB and a transparent plate 3 having a staircase-like step-difference is mounted on a second grating 2 placed behind the first grating 1. The transparent plate 3 is formed from a material having a high index of refraction which is stepped so that the range of the gap G becomes $G_0$ to $(G_0 + 2P^2/\lambda)$ optically. An optical path difference is given to each portion of the laser beam LB by means of the transparent plate 3 having the step difference. Since the range of the optical distance $2P^2/\lambda$ is divided into five by the transparent plate 3 having a step difference in FIG. 1, the transparent plate 3 is constructed in a staircase form of five steps. A lens group 4 arrayed one-dimensionally behind the second grating 2 collects luminous fluxes that have passed through areas which have been divided into five areas different in optical distance. Light which has been collected by the lens group 4 is detected by a photodiode group 5 independently of others. Thereafter, a signal from the photodiode group 5 is added by an adder 7 composed of an operational amplifier, etc. and a displacement signal is obtained.

In FIG. 2, the first grating 1 and the second grating 2 are placed in parallel to each other and a random optical-path difference plate 9 is mounted on the second grating 2. This random optical-path difference plate 9 is formed from a transparent plate which has been irregular at random in one side and has been plane in another side so that the optical-path difference in each portion of the laser beam LB becomes random in the range of $2P^2/\lambda$. Each of the laser beams LB is collected on a diffusion plate 10 independently of the others by the lens group 4, and it is arranged that the focal points of the lens group 4 are arrayed in one row on the diffusion plate 10 without overlapping. Each of the luminous fluxes where the laser beam LB is collected becomes coherent light by the diffusion plate 10. Light diffused by the diffusion plate 10 passes through a convex lens 11 and is detected by an optical sensor 12 such as a photodiode. Because the diffusion plate 10 is used, luminous fluxes which have passed through different gap optical-path length are averaged without interfering with each other.

In FIG. 3, the first grating 1 is positioned perpendicularly to the laser beam LB, and the second grating 2 is positioned inclined with respect to the first gratings 1. The gap between each of the first gratings 1 and each of the second gratings 2 is so adjusted that it includes the range of $2P^2/\lambda$ in an area where each of the first grating 1 and each of the second gratings 2 face each other. Of the light beams which have been transmitted through each of the first gratings 1 and each of the second gratings 2, only the zero-order diffracted light $L_0$ enters the light-receiving surface of a photo detector 13 positioned behind and is detected.

In each of the above-mentioned averaged diffraction moire position detectors, a position is detected accurately in such a way that the amount of light obtained at a certain position, i.e., an electrical signal converted by a photo detector or the like, is detected and corresponding position data is output, or corresponding position data is output based on the relationship among a plurality of light amounts whose phases are different from each other.

However, when, for example, the amount of light generated from a light source changes due to some reason, the light amount will not be fixed at the same position and an error will occur regarding the detection of a position.

FIGS. 4 and 5 are perspective view showing an example of the optical system of the averaged diffraction moire position detector which eliminates the above-mentioned drawbacks and a block diagram showing an example of the detector's processing circuit, respectively. The first gratings 1 are positioned perpendicularly to the laser beam LB, and the second grating 2s are positioned inclined with respect to the first gratings 1. The gap between the first gratings 1 and the grating sections 2A and 2B of the second gratings 2 is so adjusted that it includes the range of $2P^2/\lambda$ in an area where the first gratings 1 and the grating sections 2A and 2B of the second gratings 2 face each other. Of the light beams which have been transmitted through the first gratings 1 and the grating sections 2A and 2B of the second gratings 2, the zero-order diffracted light is collected by a cylindrical lens 23, enters the light-receiving surfaces of measuring photo detectors 14A and 14B positioned behind and is detected. The phase of each grating line of the grating sections 2A and 2B of the second gratings 2 deviates in the direction of displacement, and electrical signals of different phases are generated in the measuring photo detectors 14A and 14B to which the light beam which has been transmitted through each of the grating sections 2A and 2B as the second gratings 2 is displaced. Meanwhile, a transmission section 17, which transmits a narrow light beam in the longitudinal direction of the first gratings 1, for monitoring a quantity of light is disposed in the vicinity of the first grating 1. Part of the laser beam LB is transmitted through the transmission section 17 for monitoring a quantity of light, enters the photo detector 16 for monitoring a quantity of light, and is converted into an electrical signal corresponding to the quantity of light. Electrical signals VA and VB from the measuring photo detectors 14A and 14B are sent out to calibrators 18A and 18B, respectively, these signals are calibrated by an electrical signal SL from the photo detector 16 for monitoring a quantity of light, and they are sent out to a signal/position converter 19 in which they are converted to position data.

According to the averaged diffraction moire position detector constructed as described above, even if the amount of light emission from a light source varies, or the transmittance of the first gratings 1 varies, no error will occur regarding a position to be detected.

In the above-mentioned conventional averaged diffraction moire position detector, since the position of the transmission section 17 for monitoring a quantity of light and that of the first gratings 1 are spaced apart, proper calibration is impossible in the case, for example, where transmittance is changed partially on the first gratings 1, or the transmittance of the second gratings 2 is changed. The conventional detector has another drawback in that the total size of the detector becomes larger since the transmission section 17 for monitoring a quantity of light is required.

SUMMARY OF THE INVENTION

The present invention has been devised in light of the above-mentioned drawbacks of the conventional art. An object of the present invention is to provide an averaged diffraction moire position detector which is capable of performing an accurate monitoring of the quantity of light at all times and is smaller.

According to one aspect of the present invention, for achieving the objects described above, there is provided an averaged diffraction moire position detector which is capable of detecting the relative displacement of a diffraction grating in the lateral direction by using a signal change such that half the pitch P of a diffraction grating which appears at an average value is used as a cycle, comprising; a first diffraction grating; a second diffraction grating which is displaced in the lateral direction with respect to the first diffraction grating; optical-path length adjustment means, disposed between said two diffraction gratings, for varying the optical-path length of the gap between said two diffraction gratings over the range of an optical-path length equivalent to a Fresnel number 2 or an integral multiple of 2 for each part of an effective area of said two diffraction gratings; an d average value calculation means for obtaining a signal equivalent to the average value of the diffraction moire signals over the effective areas of said two diffraction gratings, wherein said averaged diffraction moire position detector includes a calibration means for calibrating a relative displacement signal of said diffraction grating in the lateral direction obtained by detecting even-number-order diffracted lights among respective order diffracted lights diffracted by said first and second diffraction gratings, by a calibration signal obtained by detecting odd-number-order diffracted lights among said respective order diffracted lights.

These and other objects, features and advantages of the present invention will become clear when reference is made to the following description of the preferred embodiments of the present invention, together with reference to the accompanying drawings.

BRIEF DESCRIPTION OF THE DRAWINGS

In the accompanying drawings:

FIGS. 10 and 11 are characteristic views illustrating the relationships between the relative displacement and the diffracted light intensity in the averaged diffraction moire position detector of the present invention.

DESCRIPTION OF THE PREFERRED EMBODIEMNTS

First, the principles of the present invention will be explained.

When parallel luminous fluxes whose phases are uniform are entered into two diffraction gratings, the diffracted light intensity of each order varies depending on the relative displacement of the two diffraction gratings in the lateral direction and the gap between two diffraction gratings. If the grating constant of a diffraction grating is denoted by P, the relative displacement of two diffraction gratings by x, the gap between two diffraction gratings by g, and the wavelength of parallel luminous fluxe s by $\lambda$, the diffracted light intensity I of the first-order diffracted light is expressed by the following equation (1):

$$I(x, g) = A\sin\left\{2\pi\left(\frac{x}{P} + \frac{\lambda}{2P^2}g\right)\right\} + B \quad (1)$$

where A and B are constants

Figure 6:
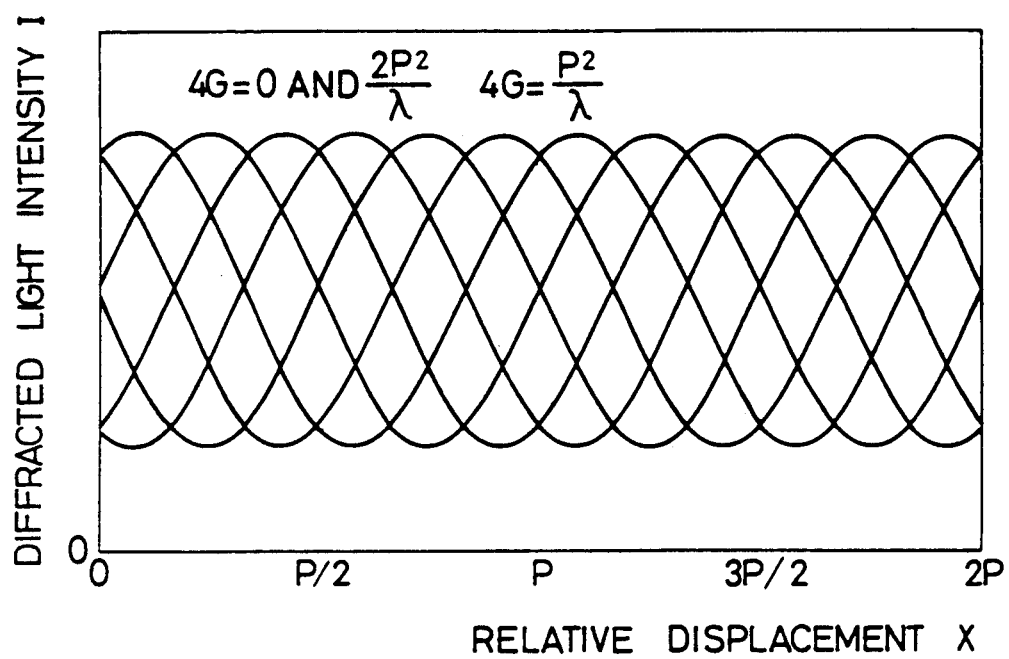
FIG. 6 is a characteristic view illustrating the relationships between relative displacement and diffracted light intensity for explaining the principles of the present invention.

FIG. 6 is a characteristic view illustrating the relationships between the relative displacement x of two diffraction gratings and the diffracted light intensity I of the first-order diffracted light. As is apparent from the above equation (1), the diffracted light intensity I varies in the form of a sine-wave by the relative displacement x of two diffraction gratings and its phase shifts proportionally to the gap g of the two diffraction gratings, and returns to the original phase with the gap g of the two diffraction gratings as a cycle. Therefore, if this signal is integrated over the range of the gap $g = \lambda/2P^2$ of the two diffraction gratings, a signal independent of the relative displacement x of the two diffraction gratings, and of the gap g of the two diffraction gratings, can be obtained. That is, the integration (the following equation (2)) of the diffracted light intensity I of the first-order diffracted light in the range of a certain gap ("G+2P²/λ" to "G"), is independent of the relative displacement x of the two diffraction gratings and of the gap g of the two diffraction gratings.

$$\int_{G}^{G + \frac{2P^2}{\lambda}} I(x,g)dg \quad (2)$$

By this fact it may be said that an increase or decrease in this signal indicates the change in the quantity of light from the light source itself, and the change in the transmittance on a light path from the light source to a photo detector through the two diffraction gratings. By utilizing this principle, an accurate monitoring of a quantity of light is made possible.

Figure 1:
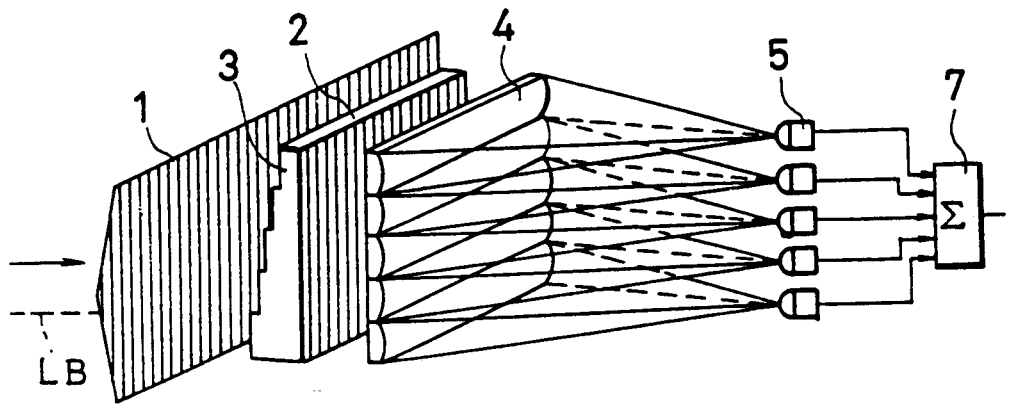
FIGS. 1 to 4 are perspective views illustrating an example of the optical system of a conventional averaged diffraction moire position detector, respectively.
Figure 2:
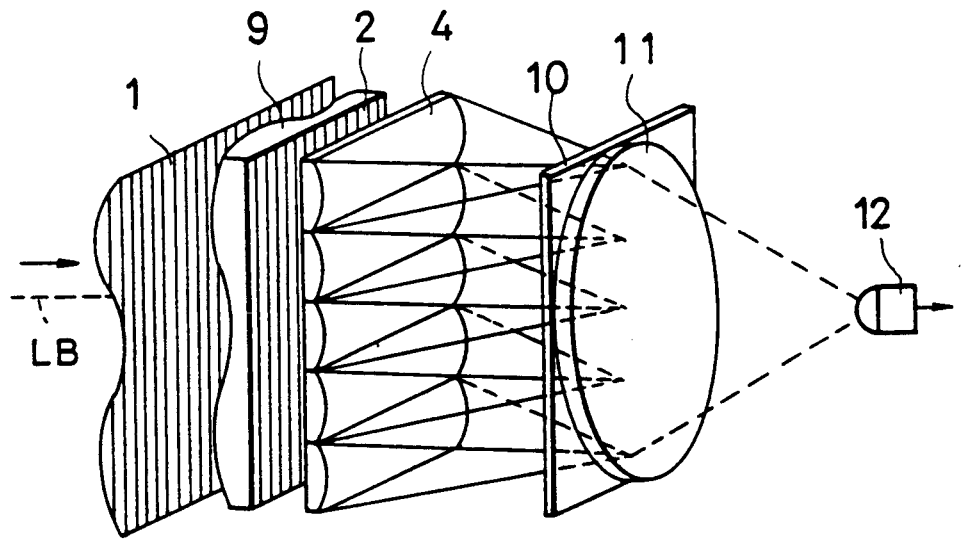
Figure 3:
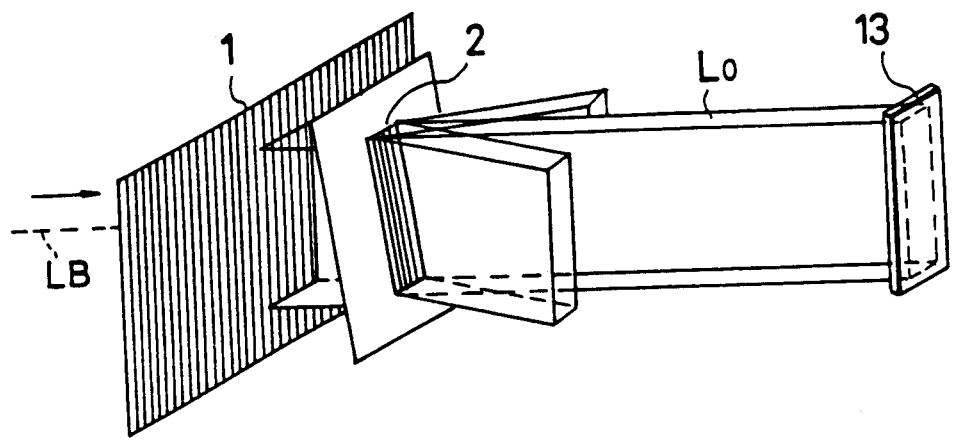
Figure 4:
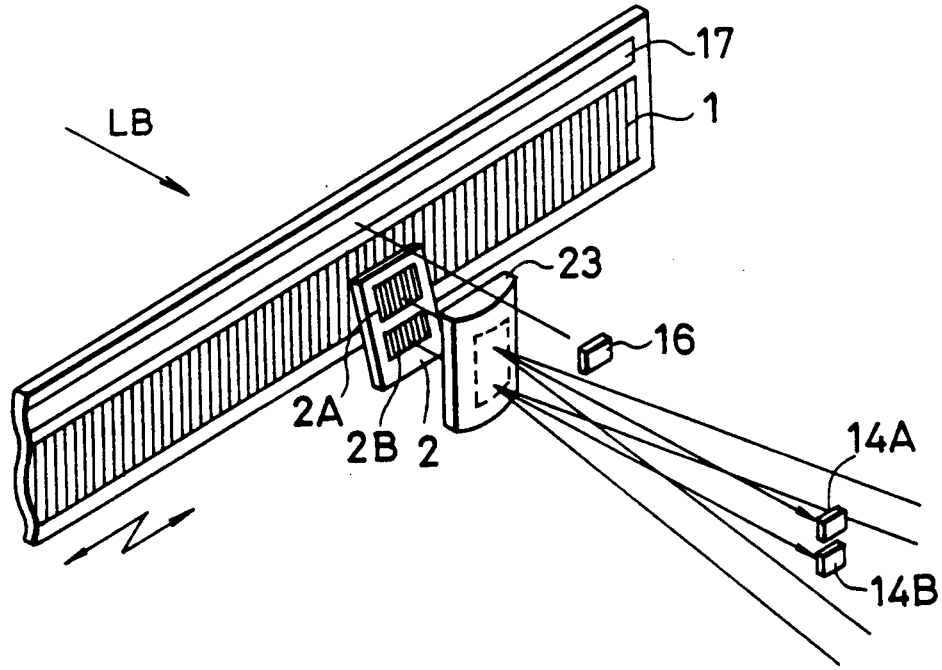
Figure 7:
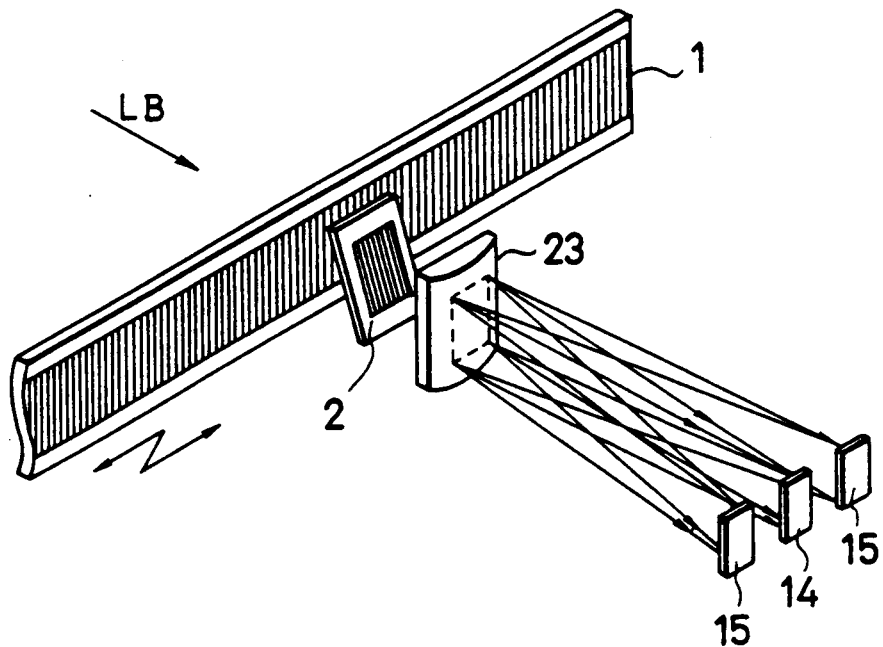
FIG. 7 is a perspective view illustrating an example of the optical system of the averaged diffraction moire position detector of the present invention.

FIG. 7 is a perspective view illustrating an example of the optical system of an averaged diffraction moire position detector of the present invention which corresponds to FIG. 4. Like reference numerals are given to the same parts and an explanation thereof is omitted.

Of the lights which have passed through the first grating 1 and the second grating 2, the zero-order and the ± first-order diffracted lights are each collected by the cylindrical lens 23, enter the light-receiving surfaces of the corresponding measuring photo detector 14 and photo detectors 15 and 15 for monitoring a quantity of light which are positioned behind, and are detected. An electrical signal generated in the measuring photo detector 14 corresponding to the zero-order diffracted light is independent of the gap of each of the first gratings 1 and each of the second gratings 2, but varies by the relative displcement of each of the first gratings 1 and each of the second gratings 2 and at the same time varies by the change in the transmittance of each of the first gratings 1 and each of the second gratings 2. Meanwhile, an electrical signal generated in the photo detectors 15 and 15 for monitoring a quantity of light corresponding to the ± first-order diffracted lights is independent of the gap and the relative displacement between each of the first gratings 1 and each of the second gratings 2 and varies by the change in the quantity of light of the light source and in the transmittance of each of the first gratings 1 and each of the second gratings 2. Therefore, of the electrical signals generated in the measuring photo detectors 14, the components due to the change in the quantity of light of the light source and in the transmisstance of each of the first gratings 1 and each of the second gratings 2, are removed from the change in the electrical signals generated in the photo detectors 15 and 15 for monitoring a quantity of light so that only the components due to the relative displacement between each of the first gratings 1 and each of the second gratings 2 are picked out. Therefore, accurate displacement detection is made possible.

Figure 5:
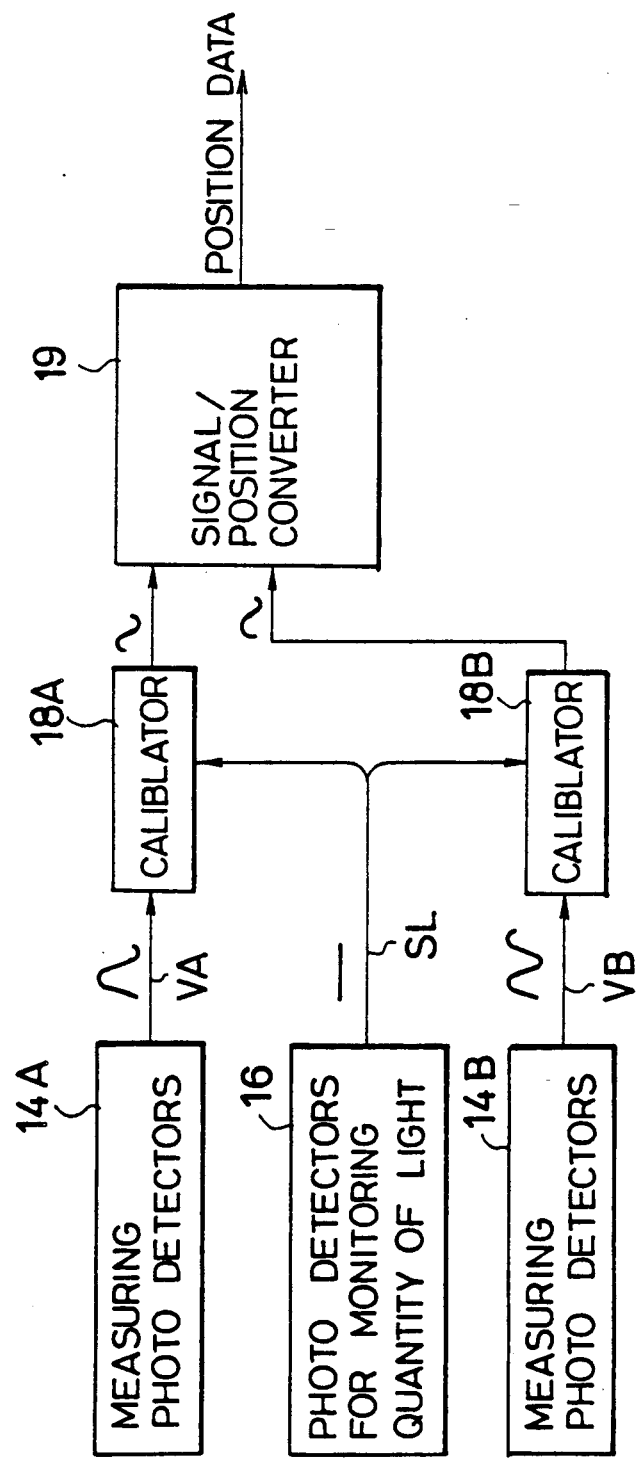
FIG. 5 is a block diagram illustrating an example of a processing circuit used in the optical system of the averaged diffraction moire position detector shown in FIG. 4.
Figure 8:
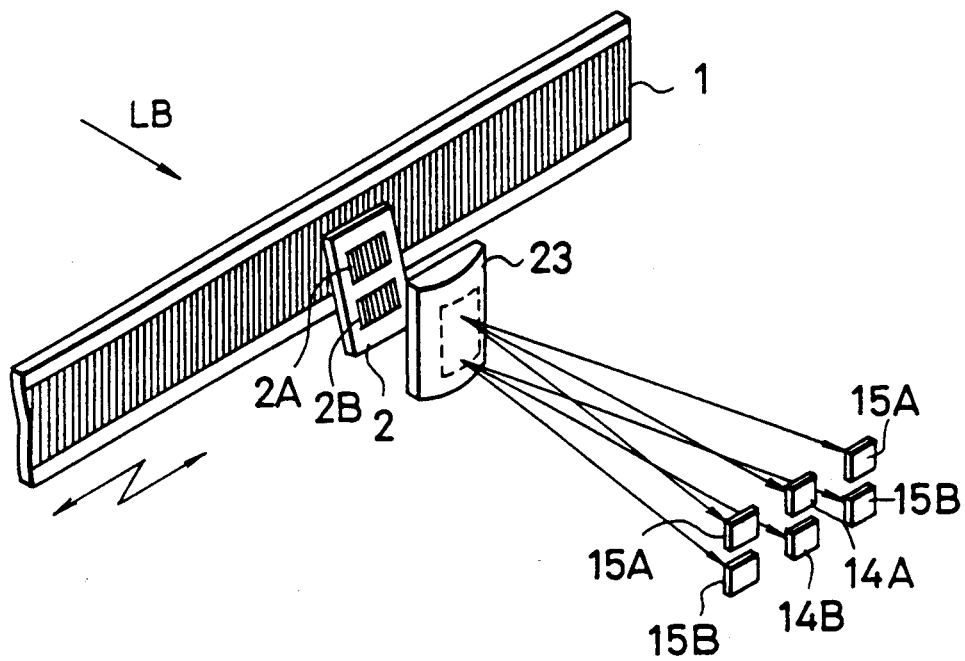
FIGS. 8 and 9 are a perspective view illustrating another example of the averaged diffraction moire position detector of the present invention and a block diagram illustrating its processing circuit.
Figure 9:
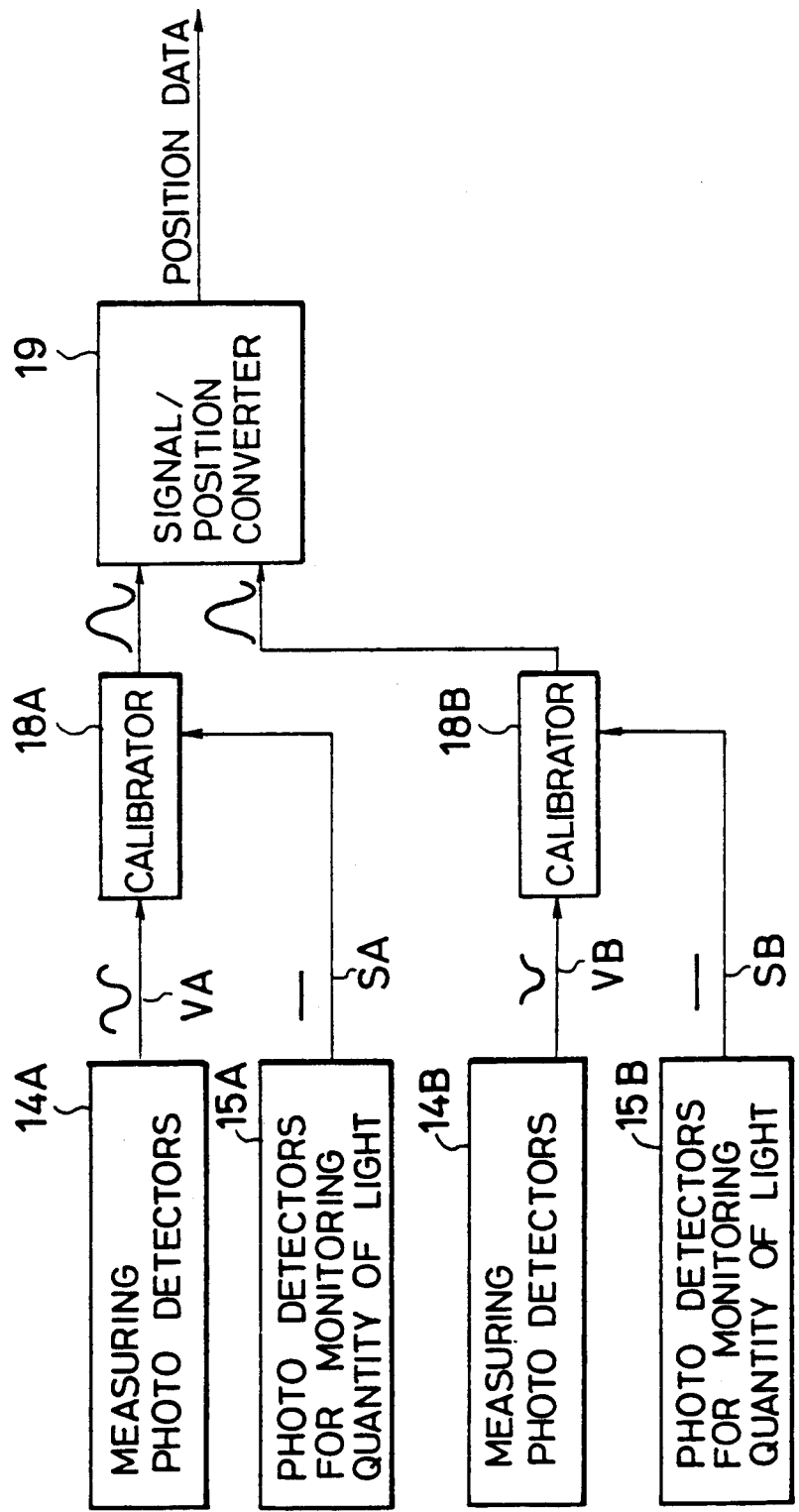

FIGS. 8 and 9 are a perspective view and a block diagram illustrating another example of the averaged diffraction moire position detector of the present invention in which the optical system and the processing circuit are made to correspond to those in FIGS. 4 and 5. Like reference numerals are given to the same parts and an explanation thereof is omitted.

Of the lights which have passed through the first grating 1 and the grating sections 2A and 2B of the second grating 2, the zero-order and ± first-order diffracted lights are each collected by the cylindrical lens 23, enter the light-receiving surfaces of the corresponding measuring photo detector 14A and 14B and photo detectors 15A and 15B for monitoring a quantity of light which are positioned behind, and are detected. An electrical signal generated in the measuring photo detector 14A and 14B corresponding to the zero-order diffracted light varies with a predetermined phase difference in consequence of the relative displacement of each of the first gratings 1 and each of the second gratings 2 and at the same time varies by the change in the transmittance of each of the first gratings 1 and each of the second gratings 2. Meanwhile, an electrical signal generated in the photo detectors 15A and 15B for monitoring a quantity of light correspond to the ± first-order diffracted lights is independent of the gap and the relative displacement between each of the first gratings 1 and each of the second gratings 2 and varies by the change in the quantity of light of the light source and in the transmittance of each of the first gratings 1 and each of the second gratings 2. Light which enters the photo detector 15A for monitoring a quantity of light is the same light as that which enters the measuring photo detector 14A, that is, light which has passed through the first grating 1, the grating section 2A of the second grating 2, and the cylindrical lens 23. Therefore, the components other than the displacement signal in the electrical signals generated in the measuring photo detector 14A can be detected very accurately. This fact similarly applies to the photo detector 15B for monitoring a quantity of light. Thus, electrical signals VA and VB from the measuring photo detectors 14A and 14B are sent out to the calibrators 18A and 18B, respectively, and the disturbance components (components due to the change in the quantity of light of a light source or in the transmittance of each of the first gratings 1 and each of the second gratings 2) are removed by the electrical signals SA and SB from the photo detectors 15A and 15B for nitoring a quantity of light and are calibrated. As a result, accurate position data can be obtained.

FIG. 10 is a characteristic view illustrating the relationships between the relative displacement x of each of the diffraction gratings 1 and 2, and the intensities $I_{VA}$ and $I_{VB}$ of the diffracted lights which enter the measuring photo detectors 14A and 14B and the intensities $I_{SA}$ and $I_{SB}$ of the diffracted lights which enter the photo detectors 15A and 15B for monitoring a quantity of light. The intensities $I_{VA}$ and $I_{VB}$ of the diffracted lights which enter the measuring photo detectors 14A and 14B are expressed by the following equation (3), and the intensities $I_{SA}$ and $I_{SB}$ of the diffracted lights which enter the photoe detectors 15A and 15B for monitoring a quantity of light are expressed by the following equation (4).

$$\left. \begin{array}{l} I_{VA} = \sin x + b \\ I_{VB} = \cos x + b \end{array} \right\} \quad (3)$$

where b indicates offset component $$\left. \begin{array}{l} I_{SA} = M_A \\ I_{SB} = M_B \end{array} \right\} \quad (4)$$

where $M_A = M_B$

However, the quantity of light of a light source and transmittances of each of the first grating 1 and each of the second grating 2 become unbalanced between the intensities $I_{VA}$ and $I_{VB}$ of the diffracted lights which enter the measuring photo detectors 14A and 14B. When the level of the diffracted light intensity $I_{VB}$ reaches 1/a of the diffracted light intensity $I_{VA}$, the diffracted light intensities $I_{VA}$ and $I_{VB}$ become as in equation (5), and the intensities $I_{SA}$ and $I_{SB}$ of the diffracted lights become as shown in equation (6). A characteristic view in this case will be as shown in FIG. 11.

$$\left. \begin{array}{l} I_{VA} = \sin x + b \\ I_{VB} = a(\cos x + b) \end{array} \right\} \quad (5)$$

$$\left. \begin{array}{l} I_{SA} = M_A \\ I_{SB} = M_B/a \end{array} \right\} \quad (6)$$

In such a case, since, for example, a division function is contained in the calibrators 18A and 18B shown in FIG. 9 and each of them calculates VA/SA and VB/SB, the electrical signals VA/SA and VB/SB after calibration are expressed by the following equation (7), and the influence of the above-mentioned unbalance is eliminated.

$$\left. \begin{array}{l} VA/SA = c(\sin x + b) \\ VA/SB = c(1/a)a(\cos x + b) = c(\cos x + b) \end{array} \right\} \quad (7)$$

where c is a constant

In the above-mentioned embodiments, the zero-order diffracted light is used for measuring displacements, and the ± first-order diffracted lights are used for monitoring a quantity of light. However, even-number-order diffracted lights may be used for measuring displacement; odd-number-order diffracted lights may be used for monitoring a quantity of light.

As has been explained above, according to the averaged diffraction moire position detector of the present invention, since an accurate monitoring of a quantity of light can be effected at all times, the position detection accuracy can be improved and, because its size is small, the range in which it can be installed is wider.

Many widely different embodiments of the present invention can be made without departing form the sprit and scope thereof, therefore, it is to be understood that this invention is not limited to the specific embodiments thereof except as defined in the appended claims.

What is claimed is:

1. An averaged diffraction moire position detector which is capable of detecting the relative displacement of a diffraction grating in the lateral direction by using a signal change such that half the pitch P of a diffraction grating which appears at an average value is used as a cycle, comprising:

a first diffraction grating;

a second diffraction grating which is displaced in the lateral direction with respect to the first diffraction grating;

optical-path length adjustment means, disposed between said two diffraction gratings, for varying the optical-path length of the gap between said two diffraction gratings over the range of an optical-path length equivalent to a Fresnel number 2 or an integral multiple of 2 for each part of an effective area of said two diffraction gratings; and average value obtaining means for obtaining a signal equivalent to the average value of the diffraction moire signals over the effective areas of said two diffraction gratings, wherein said averaged diffraction moire position detector includes a calibration means for calibrating a relative displacement signal of said diffraction grating in the lateral direction obtained by detecting even-number-order diffracted lights among respective order diffracted lights diffracted by said first and second diffraction gratings, by a calibration signal obtained by detecting odd-number-order diffracted lights among said respective order diffracted lights.

2. An averaged diffraction moire position detector as claimed in claim 1, wherein said calibration means includes a function for dividing said relative displacement signal by said calibration signal.

3. An averaged diffraction moire position detector as claimed in claim 2, wherein said even-number-order diffracted lights are detected by means of a plurality of photoelectric conversion means and said odd-number-order diffracted lights are detected by a plurality of photo detector means, a plurality of said calibration means being disposed.

* * * * *